US010790681B2

(12) United States Patent
Ganiere

(10) Patent No.: US 10,790,681 B2
(45) Date of Patent: *Sep. 29, 2020

(54) VEHICLE REFRIGERATION SYSTEM AND RELATED METHODS

(71) Applicant: Jeffrey R. Ganiere, Tarpon Springs, FL (US)

(72) Inventor: Jeffrey R. Ganiere, Tarpon Springs, FL (US)

(73) Assignee: GANIERE INNOVATIONS, L.L.C., Tarpon Springs, FL (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/013,070

(22) Filed: Jun. 20, 2018

(65) Prior Publication Data

US 2018/0326813 A1 Nov. 15, 2018

Related U.S. Application Data

(63) Continuation-in-part of application No. 14/807,459, filed on Jul. 23, 2015, now Pat. No. 10,106,110.

(60) Provisional application No. 62/126,081, filed on Feb. 27, 2015, provisional application No. 62/028,096, filed on Jul. 23, 2014.

(51) Int. Cl.
| | | |
|---|---|---|
| *B60L 1/00* | (2006.01) | |
| *B60L 3/00* | (2019.01) | |
| *H02G 3/00* | (2006.01) | |
| *H02J 7/00* | (2006.01) | |
| *B60H 1/00* | (2006.01) | |
| *B60R 16/03* | (2006.01) | |
| *B60H 1/32* | (2006.01) | |

(52) U.S. Cl.
CPC ........ *H02J 7/0024* (2013.01); *B60H 1/00378* (2013.01); *B60R 16/03* (2013.01); *B60H 2001/3292* (2013.01)

(58) Field of Classification Search
CPC ... B60R 16/033; B60R 16/03; B60H 1/00428; B60H 1/00378; B60H 2001/3292; H02J 7/0024

See application file for complete search history.

(56) References Cited

U.S. PATENT DOCUMENTS

| | | | |
|---|---|---|---|
| 6,873,133 B1 | 3/2005 | Kavounas | |
| 7,800,247 B2 | 9/2010 | Chang et al. | |
| 2006/0092583 A1* | 5/2006 | Alahmad | H02J 7/0024 361/15 |
| 2009/0079384 A1* | 3/2009 | Harris | B60L 7/14 320/102 |
| 2011/0113795 A1* | 5/2011 | Montminy | B64F 1/364 62/77 |

(Continued)

Primary Examiner — Rexford N Barnie
Assistant Examiner — Rasem Mourad
(74) Attorney, Agent, or Firm — Allen, Dyer, Doppelt + Gilchrist, PA

(57) ABSTRACT

A vehicle refrigeration system includes a vehicle power device, and a vehicle refrigeration device coupled to the vehicle power device. The vehicle refrigeration device includes an evaporator configured to provide cooling based upon refrigerant fluid, a condenser configured to process the refrigerant fluid downstream from the evaporator, and a compressor configured to operate based upon a combined voltage, and transmit the refrigerant fluid from the evaporator to the condenser.

19 Claims, 10 Drawing Sheets

(56) References Cited

U.S. PATENT DOCUMENTS

| | | | |
|---|---|---|---|
| 2011/0313584 A1* | 12/2011 | Carson | H02P 9/04 |
| | | | 700/295 |
| 2012/0003526 A1 | 1/2012 | Kume et al. | |
| 2012/0091731 A1* | 4/2012 | Nelson | H02J 7/0024 |
| | | | 290/1 R |
| 2012/0204587 A1* | 8/2012 | Zamir | F25B 27/005 |
| | | | 62/228.1 |
| 2013/0026823 A1* | 1/2013 | Fetzer | B60R 16/03 |
| | | | 307/9.1 |
| 2014/0077764 A1 | 3/2014 | Brun-Buisson et al. | |
| 2014/0159495 A1* | 6/2014 | Nassar | H02J 7/0068 |
| | | | 307/71 |
| 2018/0065446 A1* | 3/2018 | Hansson | F25B 49/02 |

\* cited by examiner

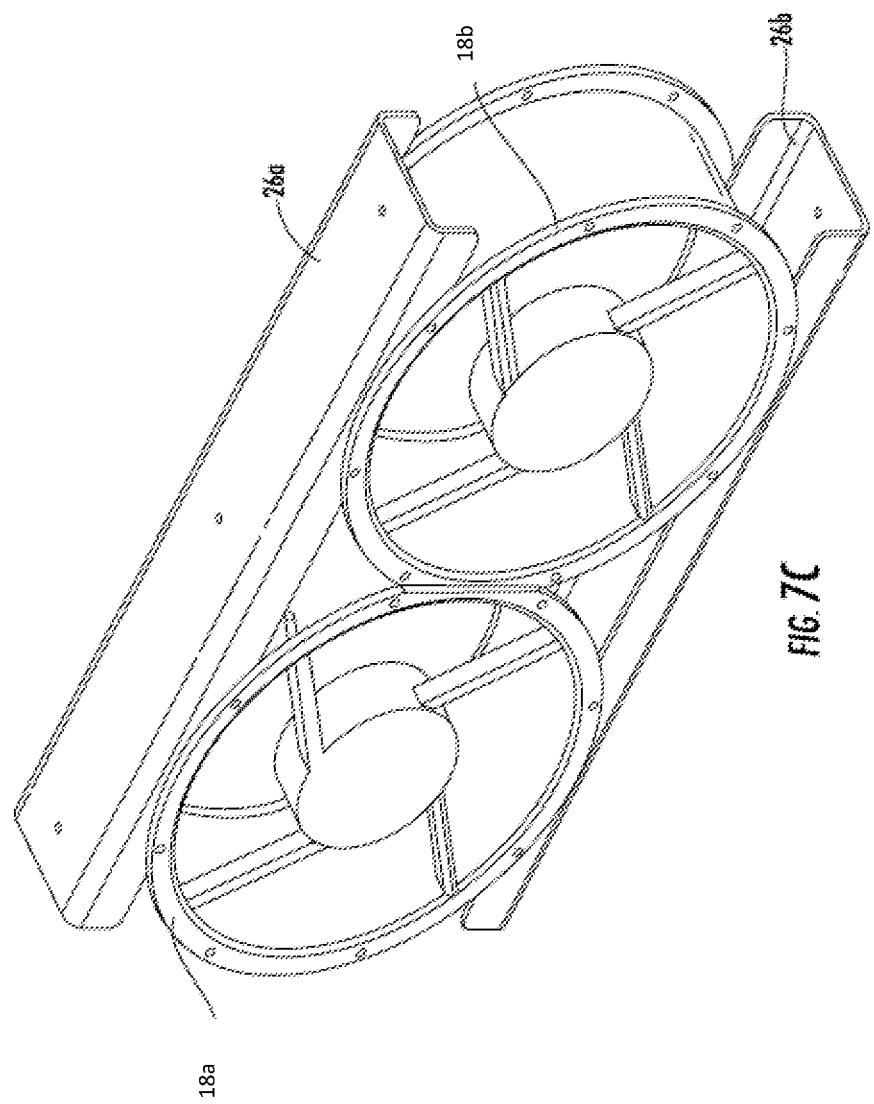

VEHICLE REFRIGERATION SYSTEM AND RELATED METHODS

RELATED APPLICATIONS

This application is a continuation-in-part of U.S. patent application Ser. No. 14/807,459 filed Jul. 23, 2015 which claims priority to U.S. Provisional Patent Application Ser. No. 62/028,096, filed Jul. 23, 2014, and U.S. Provisional Patent Application Ser. No. 62/126,081 filed Feb. 27, 2015 the entire subject matters of which is incorporated herein by reference in their entirety.

TECHNICAL FIELD

The present invention is directed to a vehicle power system, and more particularly, to a vehicle power system for providing power from batteries to a load and related methods.

BACKGROUND

The electrical requirements for the automotive, truck, boat and recreational vehicle industry have, with few exceptions, become standardized using twelve volt direct current (DC) electrical systems and using one or more twelve volt batteries wired in parallel for storage. Most vehicles have twelve volt lights, twelve volt starter motor and twelve volt ancillary motors for such things as windshield wipers, electric door locks and power windows. The twelve volt systems work well and twelve volt fractional horsepower motors are ideal for intermittent use as the current draw for these small motors is not great. Twelve volt engine starter motors produce very high torque for engine starting, but at a very high current draw, often in the range of 400 amps per hour. These motors can only run for a few minutes before they drain the vehicle battery bank and/or burn up.

The twelve volt base electrical systems in vehicles have precluded the development of practical and efficient electrically driven equipment, such as air compressors, hydraulic pumps, air conditioners and vacuum systems to be mounted on service, recreational, or over the road vehicles. As an example: If a service truck requires an air compressor for inflating tires, or running air tools, the compressor is invariably driven by an internal combustion engine. The engine requires much maintenance, is expensive to run and emits pollutants into the atmosphere. Twelve volt DC motors draw far too much current to make such a compressor a viable portable option for a continuous air supply.

Hydraulic systems for tow trucks and auxiliary hydraulic power take-offs are driven by pumps that the vehicle engine powers, or by auxiliary internal combustion engines mounted on the vehicle. Such engine-powered hydraulic pumps for equipment like hydraulic lifts, or hydraulic chain saws are lighter, safer and easier to use than their internal combustion engine counterparts. However, an internal combustion engine must be running all the time and they are loud and dirty and high maintenance items.

At any given time, there are 300,000 trucks on the road in the USA. According to the Environmental Protection Agency (EPA), they add 300 million tons of Carbon Dioxide to the atmosphere annually. The Department of Transportation (DOT) requires that drivers take a minimum of a 10 hour break every 24 hours. Currently, 90% of "over the road" trucks must idle their engines during brake time to provide air conditioning (A/C) for the sleeper.

There are a few different varieties of mobile A/C's available now, but they are either diesel powered by adding an auxiliary engine to the tractor, or they are 12 volt battery systems that are limited as to the BTU output because of the high current draw of either "direct DC" motors, or inverters.

SUMMARY

Generally speaking, a vehicle refrigeration system may include a vehicle power device. The vehicle power device may include a vehicle power source configured to output a first voltage, a plurality of batteries, each battery configured to provide a second voltage, a plurality of switches coupled between the batteries, and a controller coupled to the plurality of switches. The controller may be configured to place the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage. The vehicle refrigeration system may include a vehicle refrigeration device comprising an evaporator configured to provide cooling based upon refrigerant fluid, a condenser configured to process the refrigerant fluid downstream from the evaporator, and a compressor configured to operate based upon the combined voltage, and transmit the refrigerant fluid from the evaporator to the condenser.

More specifically, the condenser may comprise first and second condenser units being spaced apart, and first and second condenser fans being aligned with each other and both being between the first and second condenser units. The compressor may comprise an electrical motor configured to operate based upon the combined voltage, and a compressor unit configured to be driven by the electrical motor.

The controller may have has a first input coupled to an output of the vehicle power source, and the controller may be configured to place the plurality of switches in the first mode of operation only when the first voltage is greater than or equal to a threshold voltage. The controller may have a second input coupled to an output of the plurality of batteries, and the controller may be configured to place the plurality of switches in the first mode of operation only when the second voltage is less than the threshold voltage. The controller may have a third input coupled to the compressor, and the controller may be configured to place the plurality of switches in the first and second modes of operation based upon an operational characteristic of the compressor.

Also, the vehicle power device may further comprise a power switch coupled between the vehicle power source and each battery of the plurality thereof. The controller may be configured to control the power switch. The controller may be configured to close the power switch after the plurality of switches has entered the first mode of operation. The controller may be configured to open the power switch in the second mode of operation. For example, the vehicle power source may comprise a vehicle starter battery, and an alternator coupled thereto.

Another aspect is directed to a method for making a vehicle refrigeration system. The method may include coupling a vehicle power device comprising a vehicle power source configured to output a first voltage, a plurality of batteries, each battery configured to provide a second voltage, a plurality of switches coupled between the batteries, and a controller coupled to the plurality of switches. The controller may be configured to place the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage. The method may include coupling a vehicle refrigeration device to the vehicle power device. The vehicle refrigeration device may have an evaporator configured to provide cooling based upon refrigerant fluid, a condenser configured to process the refrigerant fluid downstream from the evaporator, and a compressor configured to operate based upon the combined voltage, and transmit the refrigerant fluid from the evaporator to the condenser.

Yet another aspect is directed to a method for operating a vehicle refrigeration system. The method may include operating a vehicle power device by at least operating a vehicle power source to output a first voltage, operating a plurality of batteries so that each battery provides a second voltage, operating a plurality of switches coupled between the batteries, and operating a controller coupled to the plurality of switches. The controller may to place the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage. The method may include operating a vehicle refrigeration device while coupled to the vehicle power device, the vehicle refrigeration device comprising an evaporator configured to provide cooling based upon refrigerant fluid, a condenser configured to process the refrigerant fluid downstream from the evaporator, and a compressor configured to operate based upon the combined voltage, and transmit the refrigerant fluid from the evaporator to the condenser.

BRIEF DESCRIPTION OF THE DRAWINGS

FIG. 7C is a perspective view of a portion of the compressor of the vehicle refrigeration device from the vehicle of FIG. 4 with the first and second condenser units removed.

DETAILED DESCRIPTION

Figure 1:
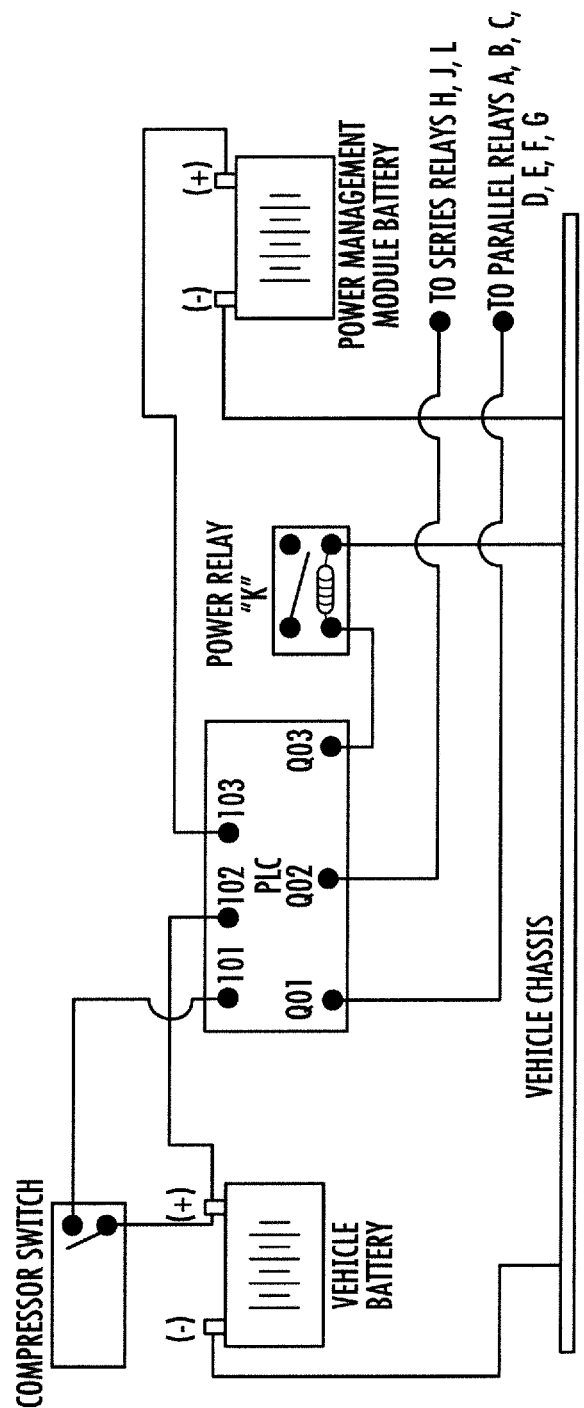
FIG. 1 is a schematic diagram of a vehicle power system, according to the present invention.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

The present invention melds twelve volt DC vehicular generating systems with twenty four, thirty six, or forty eight or any motor voltage evenly divisible by twelve. The invention may also be used in any vehicle, including but not limited to, automobiles, trucks, commercial trucks, boats, etc.

Generally speaking, a vehicle power system may include a vehicle power source configured to output a first voltage, and a plurality of batteries, each battery configured to provide a second voltage. The vehicle power system may also include a plurality of switches coupled between the batteries, and a controller coupled to the plurality of switches. The controller may be configured to place the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage, the combined voltage driving a load.

The invention uses a bank of batteries separate from the host vehicle batteries and charging system to build, in a series mode, the appropriate voltage to run motors at a higher voltage than 12 volts, for example, two batteries for 24 volts, three batteries for 36 volts, four batteries for 48 volts, etc. This separate bank of batteries remains switched to a parallel configuration which allows for individual battery charging from the host 12 volt system. At the moment a demand for a higher voltage is received, the parallel configuration is turned "off" to isolate each battery. The batteries are then switched, via the use of mechanical or solid state relays, to a series configuration, thus providing the higher voltage required to do the work.

This invention supplies electrical power for running motors of a higher voltage requirement than that of the vehicle, or boat base electrical system to run compressors or pumps on an intermittent basis. Consequently, equipment normally reliant on an internal combustion engine or an electrical power inverter can be powered by an electric motor with my invention.

In short, the basis of the present invention is the "Power Management Module" and a bank of batteries. The Power Management Module automatically switches the battery bank between a "parallel" state and a "series" state depending on a requirement. Again, to reemphasize, that although a common example of one embodiment of the present invention described herein and in the accompanying schematics refers to a 48 volt motor, requiring a bank of four 12 volt batteries, the present invention may be applied to any system requiring a bank of batteries equaling 24, 36, 48, etc.

By way of example, to run a 48 volt motor with the present inventive system, the Power Management Module must configure the battery bank to a "series" configuration to supply 48 volts for the motor. When the motor is finished running, the Power Management Module must re-configure the battery bank to a "parallel" configuration so that the vehicle 12 volt battery system can charge the batteries. The Power Management Module also embodies several other functions so as to make this system reliable. These functions will be described later.

An example for which the present invention is particularly useful would be on sailboats of sufficient size to allow for extended cruising. Typically, electric anchor windlasses are powered by 12 volt direct DC motors, motors that are much the same as starter motors for internal combustion engines. The problem is that the current draw with a 12 volt DC windlass motor is so high as to require additional batteries to be installed in the bow of the boat, near the windlass, a place where extra weight becomes critical for waterline trim. Additionally, sheet and halyard winches are usually manual crank drum type winches. With the present invention, one configuration would be to use a 48 volt alternating current (AC) motor and controller to power a hydraulic pump.

Hydraulic motors could be used to turn winches and a windlass with only small hydraulic lines lead from a central part of the vessel. When a winch was called upon for service, the present invention would switch four of the house batteries to 48 volt series configuration, and back to 12 volt parallel when the work is completed. This would be an ideal application for the present invention as winch and windlass usage are typically of a low duty cycle, but critical to maintaining proper sail trim while underway. To recharge the batteries, it is common to run the sailboat engine at least one hour per day while on a passage to charge the battery bank. Many systems on board require 12 volt based power, such as running lights, navigation systems and refrigeration.

Another excellent example for the present invention would be a vehicle mounted air compressor. For example, a 6 horsepower (hp), 3-phase, 48 volt AC motor with controller would be the appropriate size to turn a compressor that compresses air at the rate of 22 cubic feet per minute to 175 psi. The compressor stores energy in its reservoir for later use. The motor and pump are designed to run intermittently, a perfect application for the present invention.

As described above, the present invention uses a bank of batteries separate from the host vehicle batteries and charging system to build, in a series mode, the appropriate voltage to run motors at a higher voltage than 12 volts. Example, two batteries for 24 volts, three batteries for 36 volts, four batteries for 48 volts, etc. This separate bank of batteries remains switched to a parallel configuration which allows for individual battery charging from the host 12 volt system. At the moment a demand for a higher voltage is received, the parallel configuration is turned "Off" to isolate each battery. The batteries are then switched, via the use of mechanical or solid state relays, to a series configuration, thus providing the higher voltage required to do the work.

Typical System Components:
A sufficient number of 12 volt storage batteries that when wired in "series" provide the desired DC voltage (e.g. Two batteries for 24 volts DC, three batteries for 36 volts DC, 4 Batteries for 48 volts DC, etc.).
One master power solenoid, continuous duty with a 12 volt coil capable of switching 200 amps (See Power Relay "K" on drawing FIGS. 1,2 & 3);
One programmable controller or micro-processor to control the system logic (see Output 1 & Output 2 and output 3 in FIGS. 2 & 3);
Load solenoids, continuous duty, for switching between "parallel" and "series" mode. A 48 volts DC system requires ten (10) such solenoids with 12 volts DC coils and capable of switching 100 amps (See in FIGS. 2 & 3: A, B, C, D, E F, G, H, J & L). Note: a 36 volts DC motor requires eight (8) such solenoids and a 24 volts DC system requires six (6) such solenoids
Four batteries for a 48 volts DC voltage output, 3 batteries for a 36 volts DC voltage output, 2 batteries for a 24 volts DC voltage output (See in FIGS. 2 & 3: batteries, A B, C & D); and Two each Analog PLC Inputs (See FIG. 1: 102 & 103) that read 10-20 volts DC.

How the Power Management Module Works:
This invention is reliant on feedback in the form of a start and stop command from the equipment to which the Power Management Module is metering electromotive force.

The example used here is based on a 48 volt system with four 12 volt batteries. This scenario is based on a vehicle mounted electric 6 hp, 48 volt, 3-phase AC motor with a 48 volt motor controller that draws 40 amps per hour at 48 volts when running. The air compressor is typical of a 6 hp compressor that runs on 220 volt AC power, in that it compresses 22 cubic feet of air per minute to 175 psi. However in this example, the compressor is mounted on a service truck that is used to run air tools and inflate tires. For this explanation we are to consider that the truck has a 12 volt electrical system with at least a 135 amp-hour alternator for battery charging.

Explanation of the Ladder Logic (FIG. 1)
NOTE: Initially, all relays are open, and there is no power to any of the relay coils. All relay contacts are in an OPEN state. All batteries are isolated from one another and from the truck batteries.
1) When the air pressure in the reservoir of the vehicle mounted air compressor drops to a level that triggers the switch to run the compressor, 12 volts from the vehicle battery system is switched through the pressure switch to the Input on the PLC (See FIG. 1).
If Analog Input 103 (See FIG. 1) registers a voltage above 11 volts, then
a) All solenoids (see FIG. 3) A, B, C, D, E, F, G, H, J, L & K are switched off. All batteries are isolated from one another and the truck battery system.
b) One second later, Output 2 from the PLC (See FIG. 3) is turned on which in turn energizes relays H, J & L, which in turn configures batteries A, B, C & D to a series configuration to provide 48 volts DC to the compressor motor, to run the compressor.
OR:
If Analog Input 103 registers a voltage below 11 volts, then the system will not switch to series mode until the Power Management Module Batteries register over 12.8 volts, which means the truck engine must be run to increase the truck battery voltage to facilitate charging the Power Management Module Battery Bank.
2) When the Compressor Reservoir is charged to its high limit, the compressor pressure switch will switch to "open contacts". When this happens, PLC input contacts no longer have a 12 volt signal;
a) Relays H, J, & L drop out, once again isolating all batteries.
b) If Analog Input 102 registers a voltage of over 12.8 volts on the vehicle battery, and, if the Power Management Module batteries are of a lesser voltage than the vehicle batteries, then
a) One second later, PLC Output 1 closes, providing a 12 volt signal voltage to relays coils A, B, C, D, E, F & G, thereby closing the relay contacts. (Note; Contacts are closed before current is turned on to them. Arcing cannot happen as the contacts are already closed.

NOTE: PLC Analog inputs compare the voltage between 102, the vehicle battery and 103, the Power Management Module batteries. If the Power Management Module batteries have a higher voltage than the vehicle batteries, then the system will not switch to a Parallel state to prevent back charging the vehicle batteries and reducing the effective run time of the Power Management Module batteries.

b) One second later, PLC Output 3 closes, providing 12 volt signal voltage to Power Relay "K", which in turn closes contacts to provide 12 volt power to batteries A, B, C & D to charge.

If the vehicle battery system drops below 12.8 volts as measured by PLC Analog input 102 (a voltage that insures an ability to start the vehicle engine), then PLC Output 1, will not close to power A, B, C, D, E F & G. and Power Relay K will not engage. Parallel Mode FIG. 2
If
1) If the vehicle battery voltage is greater than 12.8 volts and
2) The Power Management Batteries have a charge less than the vehicle battery voltage, then
a) Relays A, B, C, D, E, F, and G are energized, the relay contacts become closed.

Figure 2:
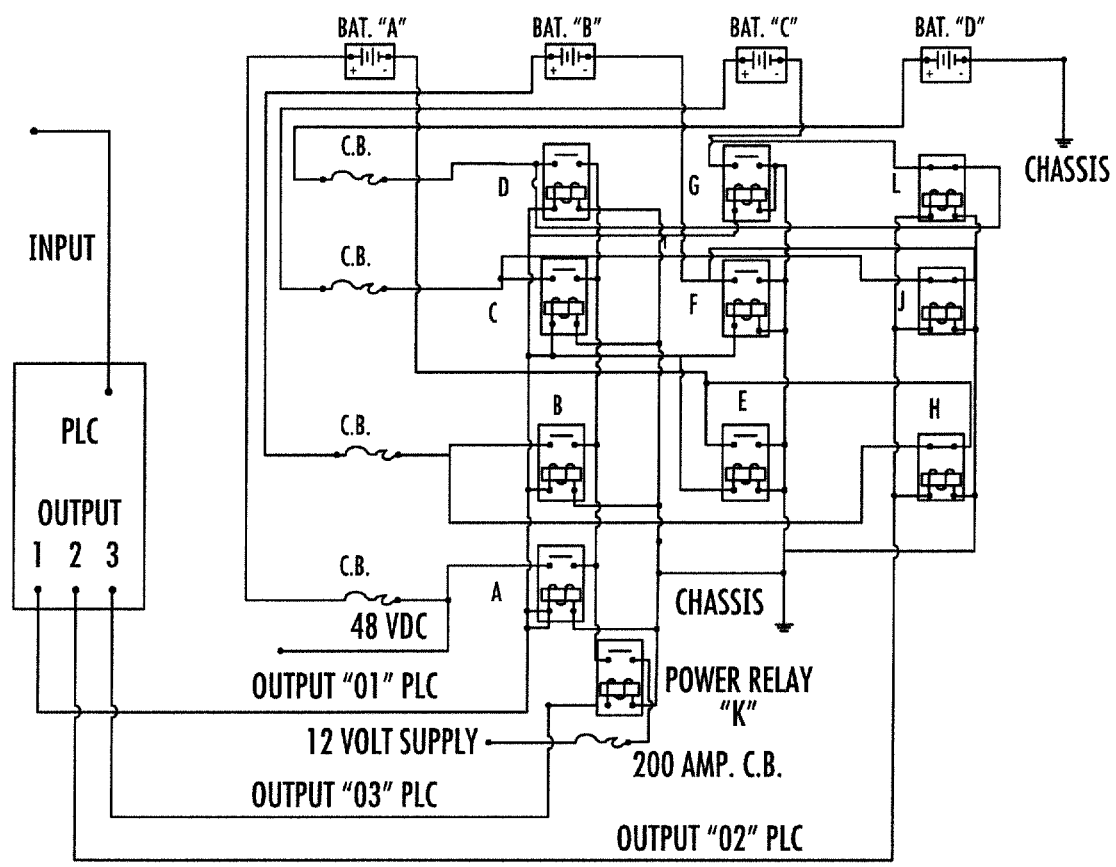
FIG. 2 is a schematic diagram of 48 volt example embodiment with the invention in a parallel mode.

NOTE: Relays H, J, and L are open as depicted in FIG. 2.
b) One second later, Power Relay (K) is energized. This provides power to charge the Power Management Module batteries A, B, C and D. As depicted in FIG. 2, each individual battery Plus side (+) becomes connected to the Positive side of the truck battery and each negative battery pole becomes connected to the Negative (chassis) side.
c) When the batteries become completely charged, the vehicle alternator will adjust itself to provide an appropriate trickle charge.

Figure 3:
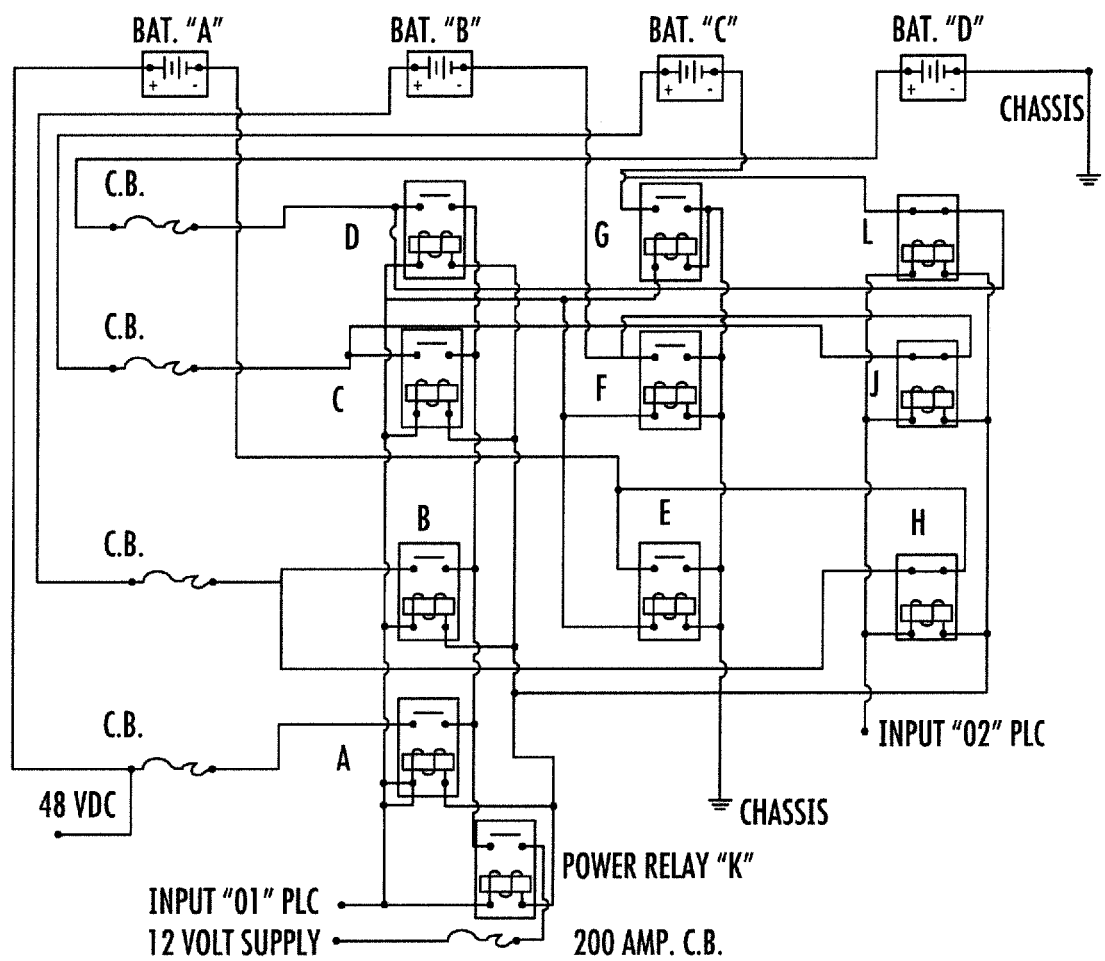
FIG. 3 is a schematic diagram of the 48 volt example embodiment with the invention in a series mode.

Series Mode FIG. 3
1) When the PLC receives a 12 volt signal Input from the compressor, indicating a low limit setting, (See PLC Input, FIG. 1)
a) The Power Relay (K) is switched off via PLC Output #3.
b) One second later relays A, B, C, D, E, F and G are switched off via PLC Output 1.
c) One second later, relays H, J, and L are energized via PLC Output 2. (FIG. 3). This in turn allows current to flow from Battery D− (Chassis) to Battery D+ (12 volts) to relay L thru to Battery C−, to Battery C+ (24 volts), to relay J, thru J to Battery B−, to Battery B+ (36 volts), to Relay H, thru H to Battery A−, to A+ (48 volts) to 48 volt motor controller.

NOTE: There are many types of equipment now available that require 48 volts DC voltage that converts power for brushless DC or three phase power. It is not the purpose of this invention to limit the use of this invention to just one type of motor controller, but merely show that high amperage 48 volt power can be delivered for intermittent use.
2) When the compressor pressure sensing contacts go open (Reservoir pressure reaches 175 psi), a) PLC INPUT (FIG. 1) drops out, Relays H, J, and L are de-energized and go to OPEN state (FIG. 2)
b) When the PLC Input 2 (See FIG. 1) senses that the vehicle charging system has a voltage greater than 12.8 volts and a voltage greater than the Power Management Module battery voltage, the system reverts to Parallel Charge as described above.

In summary, the Power Management Module interfaces equipment meant to operate on high voltage equipment, heretofore unable to run on 12 volt vehicular electrical systems. The novel concept that charging can take place intermittently while the high voltage motor is not running allows for the use of new technology type motors such as the 48 volt, 3-phase, AC motors to do the work relegated to ancillary internal combustion motors.

Figure 4:
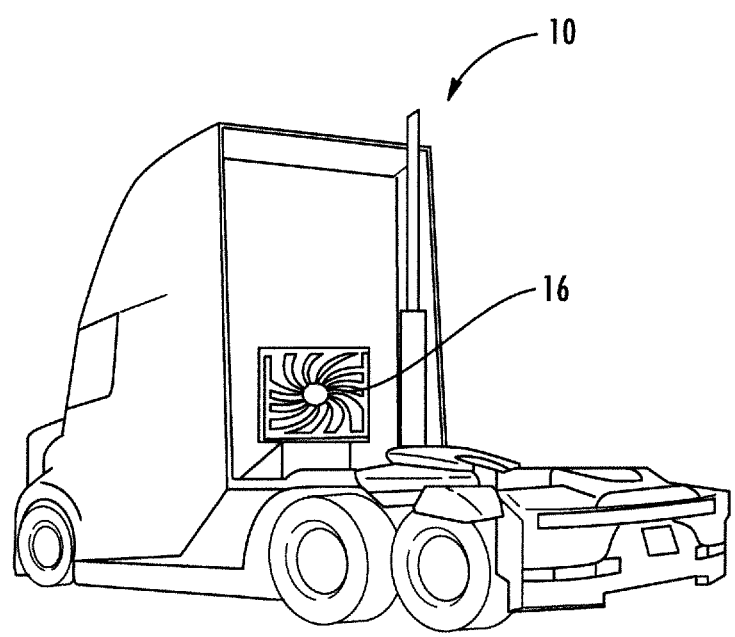
FIG. 4 is a perspective view of a vehicle with the vehicle refrigeration system, according to the present invention.
Figure 5:
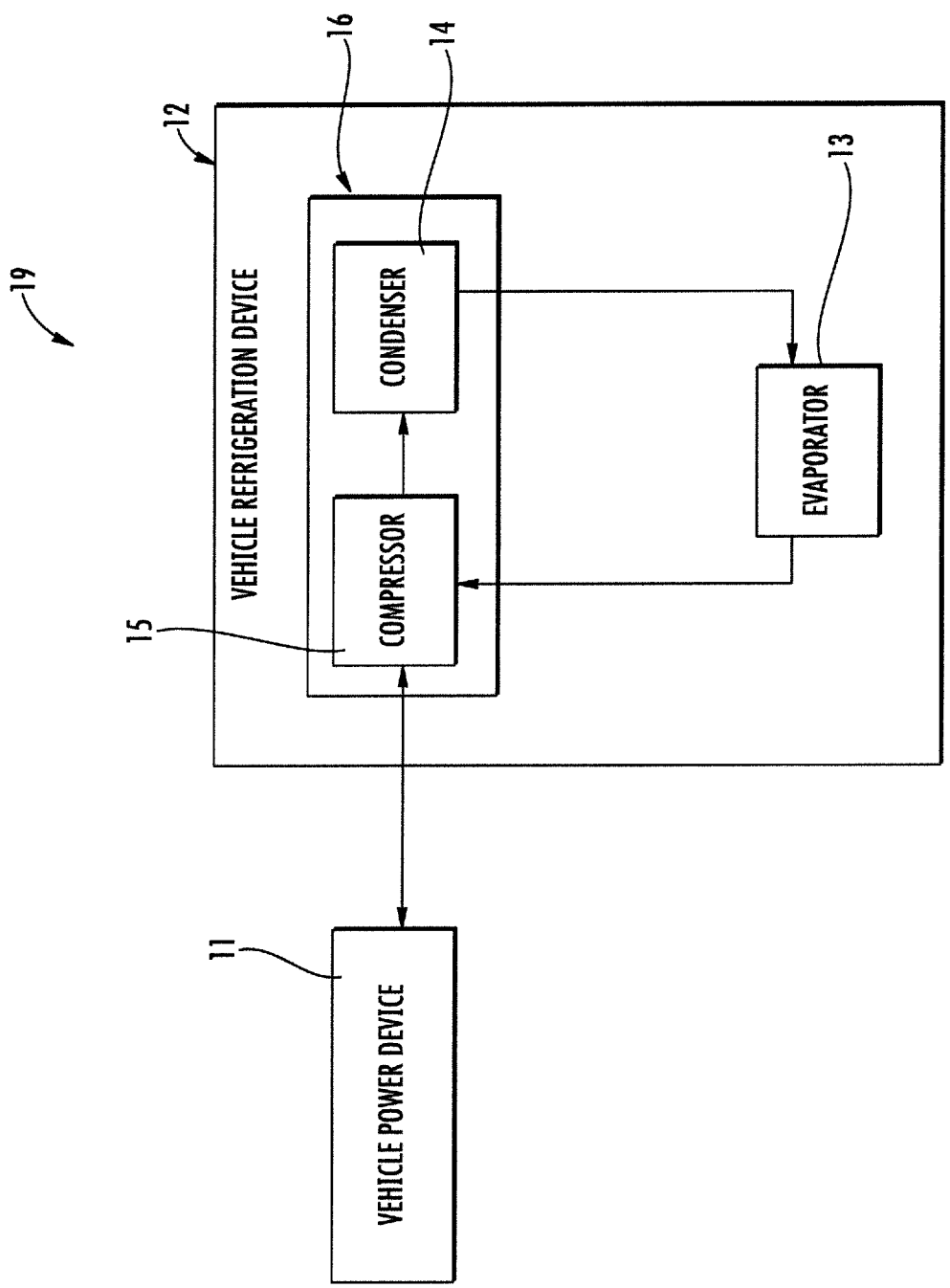
FIG. 5 is a schematic diagram of the vehicle form FIG. 4.

Referring now additionally to FIGS. 4-5, a vehicle 10 according to the present invention is now described. The vehicle 10 illustratively includes a vehicle refrigeration system 19. The vehicle refrigeration system 19 illustratively includes a vehicle power device 11. As will be appreciated, the vehicle power device 11 is similarly constituted to the vehicle power system described in FIGS. 1-3.

In the illustrated embodiment, the vehicle 10 comprises a semi-trailer truck, and the vehicle refrigeration system 19 is purposed to provide refrigeration to the passenger compartment of the vehicle, i.e. cooling function of a climate control system. Of course, the vehicle refrigeration system 19 can be installed in other vehicle types, and the vehicle refrigeration system 19 may be used to provide refrigeration to the cargo compartment of the semi-trailer truck, i.e. a refrigerator truck.

In this embodiment, the vehicle refrigeration system 19 includes a vehicle refrigeration device 12 comprising an evaporator 13 configured to provide cooling based upon refrigerant fluid, a condenser 14 configured to process the refrigerant fluid downstream from the evaporator, and a compressor 15 configured to operate based upon the combined voltage, and transmit the refrigerant fluid from the evaporator to the condenser.

As perhaps best in FIG. 4, the vehicle refrigeration device 12 illustratively includes an outdoor module 16 carrying the compressor 15 and the condenser 14. Given that the condenser and compressor release large amounts of thermal energy (i.e. radiated heat), they are desirably stationed on the exterior of the vehicle 10 where they wouldn't hamper refrigeration efforts. Helpfully, the outdoor module 16 is flexible and self-contained, and permits installation throughout the vehicle 10. In other words, the rearward cab installation in the illustrated embodiment is merely exemplary, and the outdoor module 16 could also be installed elsewhere, such as adjacent the fuel tank under the fuel tank side fairings.

The outdoor module 16 includes an outer housing for carrying the internal components. The outer housing is perforated to permit sufficient air flow for the components therein. Also, the outdoor module 16 includes first and second valve connections for coupling refrigerant hoses thereto. The refrigerant hoses are routed to the evaporator 13.

Figure 6:
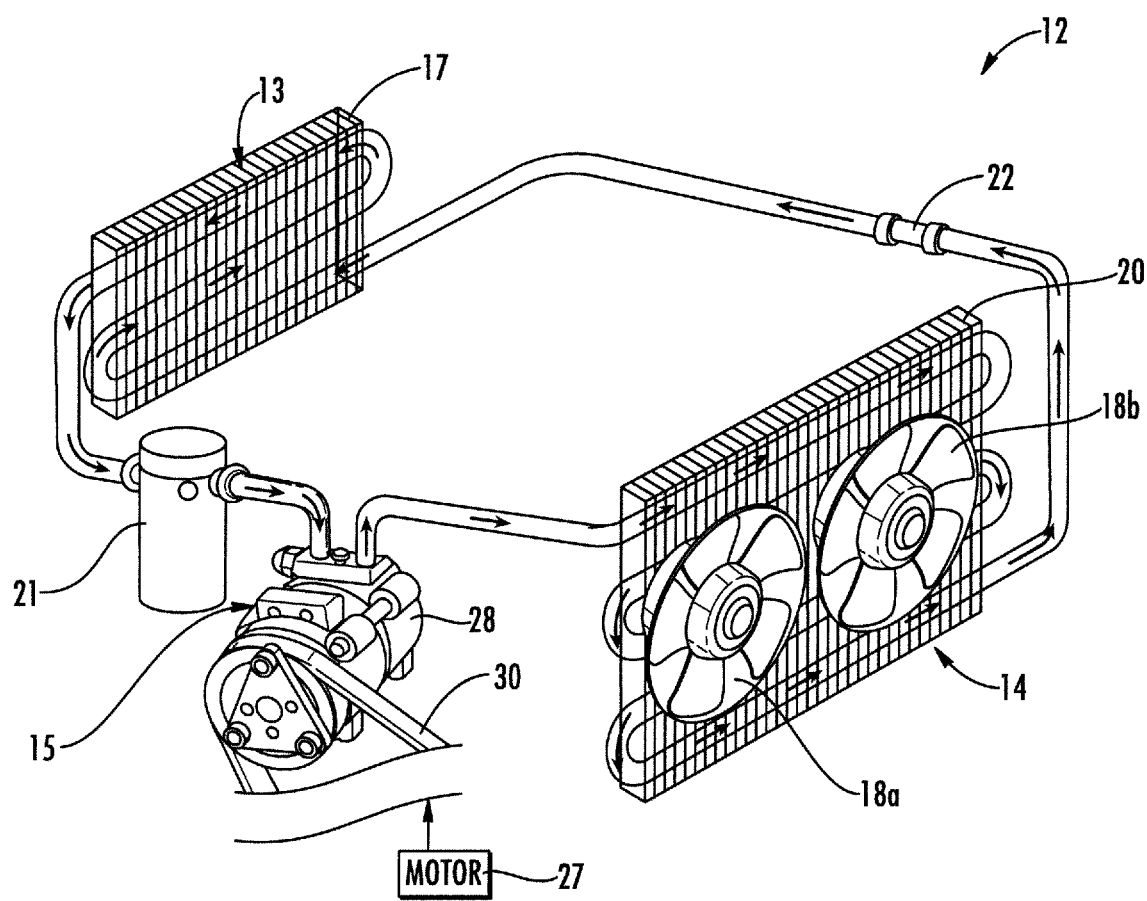
FIG. 6 is a schematic diagram of the vehicle refrigeration device from the vehicle of FIG. 4.
Figure 7A:
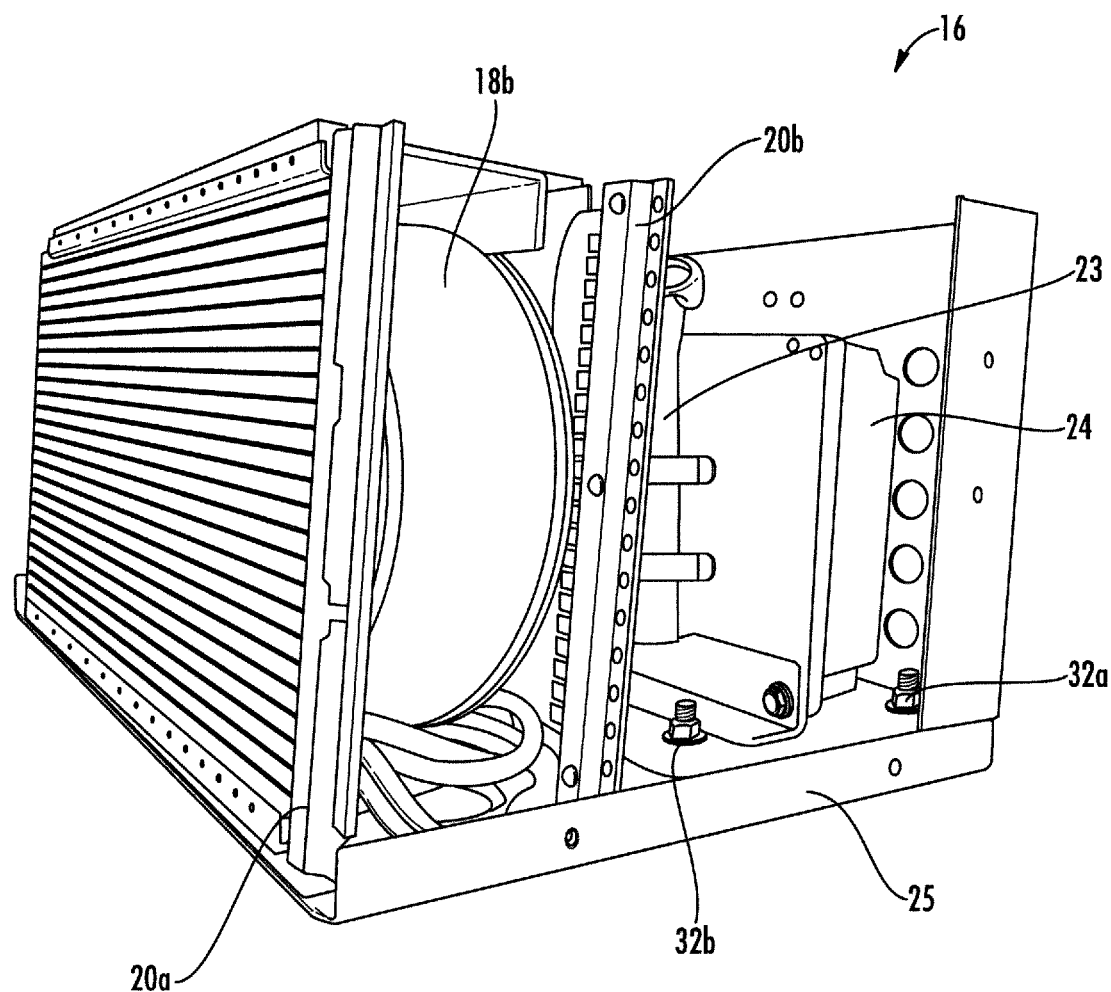
FIG. 7A is a perspective view of a portion of the vehicle refrigeration device from the vehicle of FIG. 4.
Figure 7B:
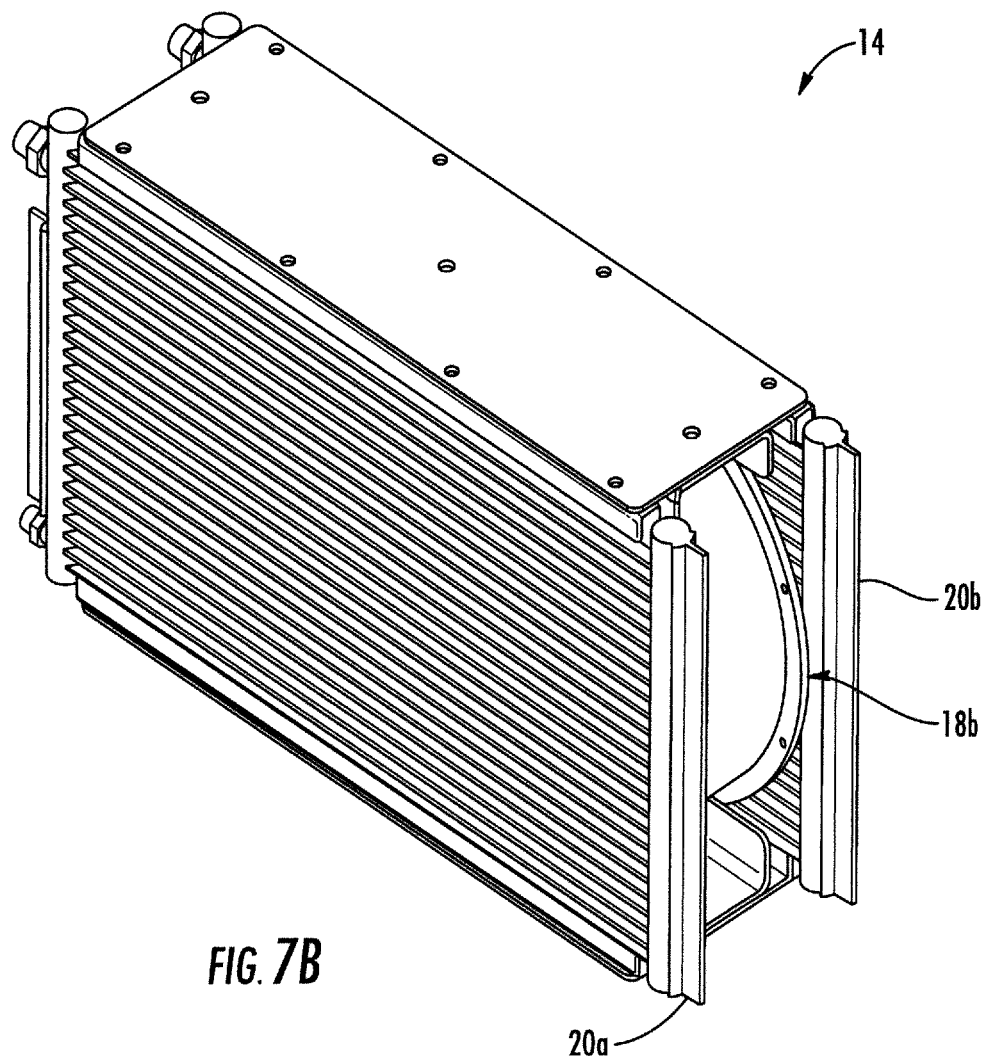
FIG. 7B is a perspective view of the compressor of the vehicle refrigeration device from the vehicle of FIG. 4.

Referring now additionally to FIGS. 6-7C, the vehicle refrigeration device 12 illustratively includes the compressor 15 having an electrical motor 27 configured to operate based upon the combined voltage (e.g. 40-60 volts), and a compressor unit 28 configured to be driven by the electrical motor via a belt 30. The compressor forces the refrigerant fluid into the condenser 14. The condenser 14 illustratively includes first and second condenser units 20a-20b being spaced apart, and first and second condenser fans 18a-18b being aligned with each other and both being between the first and second condenser units. As perhaps best seen in FIG. 7C, the condenser 14 includes first and second rails 26a-26b for mounting the first and second condenser fans 18a-18b between the first and second condenser units 20a-20b.

The vehicle refrigeration device 12 illustratively includes an inline filter 22 downstream from the condenser 14. Once the condenser 14 reverts the refrigerant fluid into the liquid state, the refrigerant fluid is processed through the inline filter 22. The vehicle refrigeration device 12 illustratively includes an evaporator 13 downstream from the inline filter 22. The evaporator 13 illustratively includes an evaporator coil 17. As will be appreciated, the liquid state refrigerant fluid is passed through the evaporator coil 17 and removes thermal energy from the ambient air, and then converts the refrigerant fluid into the gas state. Although not depicted, the evaporator 13 may include a fan to force air over fins of the evaporator coil 17. The vehicle refrigeration device 12 illustratively includes an accumulator 21 between the evaporator 13 and the compressor 15 and configured to trap moisture and debris in the refrigerant fluid.

Figure 7D:
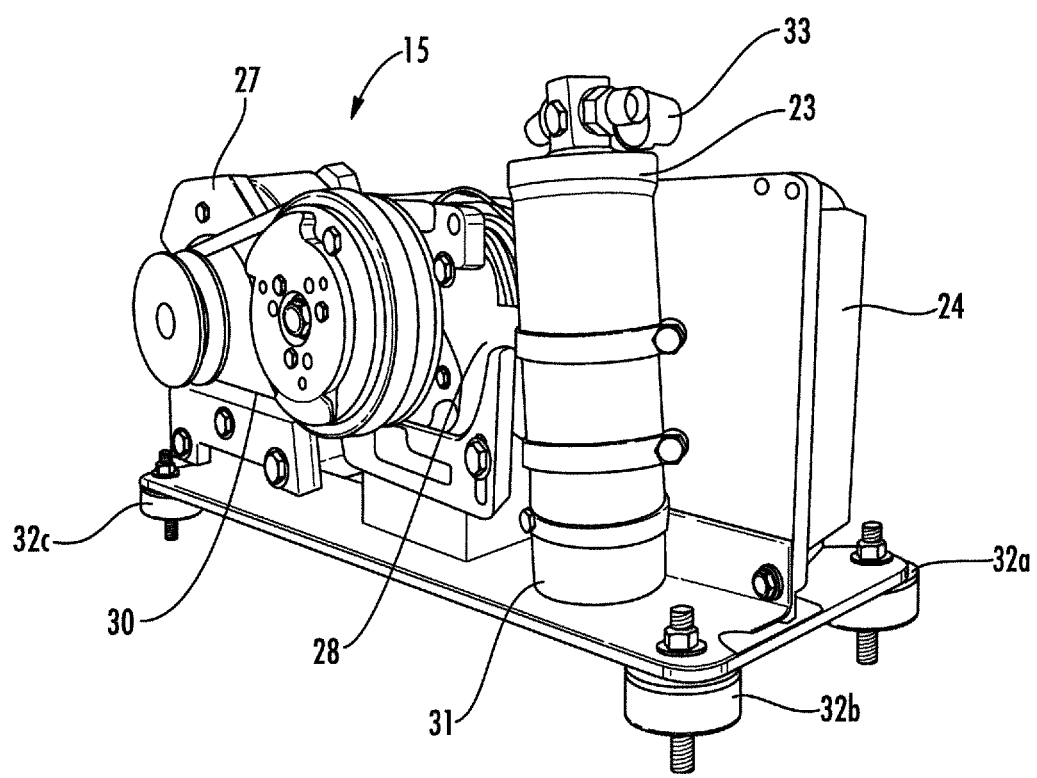
FIG. 7D is a perspective view of a portion of the vehicle refrigeration device from the vehicle of FIG. 4.

As perhaps best seen in FIGS. 7A and 7D, the outdoor module 16 is shown with the outer housing removed. The outdoor module 16 illustratively includes a frame 25. The first and second condenser units 20a-20b, and the first and second condenser fans 18a-18b are carried by the frame 25. The outdoor module 16 illustratively includes a dryer unit 23, and a controller 24 also carried by the frame 25. In FIG. 7D, the frame 25 is removed along with the outer housing, and a subframe 31 is shown. The outdoor module 16 illustratively includes a dryer pressure switch 33 coupled to the dryer unit 23, and a plurality of feet 32a-32c coupled to the subframe 31 for coupling the subframe to the frame 25.

Another aspect is directed to a method for making a vehicle refrigeration system 19. The method includes coupling a vehicle power device 11 comprising a vehicle power source configured to output a first voltage, a plurality of batteries, each battery configured to provide a second voltage, a plurality of switches coupled between the batteries, and a controller coupled to the plurality of switches. The controller is configured to place the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage. The method includes coupling a vehicle refrigeration device 12 to the vehicle power device 11. The vehicle refrigeration device 12 includes an evaporator 13 configured to provide cooling based upon refrigerant fluid, a condenser 14 configured to process the refrigerant fluid downstream from the evaporator, and a compressor 15 configured to operate based upon the combined voltage, and transmit the refrigerant fluid from the evaporator to the condenser.

Yet another aspect is directed to a method for operating a vehicle refrigeration system 19. The method includes operating a vehicle power device 11 by at least operating a vehicle power source to output a first voltage, operating a plurality of batteries so that each battery provides a second voltage, operating a plurality of switches coupled between the batteries, and operating a controller coupled to the plurality of switches. The controller places the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage. The method includes operating a vehicle refrigeration device 12 while coupled to the vehicle power device, the vehicle refrigeration device 12 comprising an evaporator 13 configured to provide cooling based upon refrigerant fluid, a condenser 14 configured to process the refrigerant fluid downstream from the evaporator, and a compressor 15 configured to operate based upon the combined voltage, and transmit the refrigerant fluid from the evaporator to the condenser.

Advantageously, the vehicle refrigeration system 19 may develop twice the BTU output of typical system available owing to several factors. Firstly, the vehicle refrigeration system 19 may employ a 6 hp, 48 volt, 3 phase AC motor to drive a 3 ton compressor. In fact, only 2 hp is used to produce 24,000 BTU's of refrigeration. Secondly, in the vehicle refrigeration system 19, cold air generation is such that the compressor 15 only runs 25-33% of the time, i.e. providing a reduced duty cycle. Most typical systems may run close to 100% of the time to produce enough cold air to cool the sleeper, or refrigerate the cargo hold. This provides for reduced maintenance and wear and tear in the vehicle refrigeration system 19.

In an example embodiment of the vehicle refrigeration system 19, the current draw is: (resistance 2 hp) 1,500 w+48 v×0.33 (time, per hour)=10.3 amps per hour. Helpfully, there are two condenser fan 18a-18bs used to carry the heat away from first and second condenser units 20a-20b. Each condenser fan 18a-18b produces 660 cfm of air flow. In the exemplary embodiment (i.e. the outdoor module 16), by placing the first condenser unit 20a on the intake side and second condenser unit 20b on the output side, there is an increase in efficiency of about 15% over the typical side-by-side arrangement.

For example, each of the first and second condenser fans 18a-18b comprise a brushless 48 volt DC motors that draws only 0.58 amps each. This is significant because typical electric systems have to use 12 volt fans that draw about 16 amps of current. Advantageously, the vehicle refrigeration system 19 may be substantially more power efficient.

The air handler fan (i.e. the fan associated with the evaporator 13) is also a brushless DC, 48 volt fan that only draws 0.58 amps. The vehicle refrigeration system 19 may employ two conventions that add up to about 8% free cooling. In particular, the compressor 15 may have (in contrast to most typical approaches) no restriction on "short cycling" the compressor.

Therefore, when the evaporator 13 temperature drops to about 28° F., the compressor 15 shuts off, but the air handler motor continues to blow air across the chilled evaporator 13 until the evaporator temp increases to about 40° F., at which time the compressor restarts if the thermostat set point (i.e. the desired target temperature) has not been reached. When the thermostat set point has been reached, the compressor 15 turns off, but the air handler motor continues to blow air across the chilled evaporator 13 for about 90 seconds.

In an exemplary embodiment of the vehicle refrigeration system 19, each of the plurality of batteries comprise a 48 volt, 110 amp, lithium iron Poshate4 (LiFePo4) battery, which weighs 135 pounds. This is in contrast to typical approaches that use 12/24 volt based batteries.

Moreover, charging the 48 volt battery from a 12 volt supply is another feature of the vehicle refrigeration system 19. The vehicle refrigeration system 19 may not deep cycle any of the batteries. During operation, the vehicle refrigeration system 19 may use electrical power available from the battery between the voltages of fully charges 53.8 volts, down to 44 volts, at which time the compressor 15 will no longer run until a charge is applied to the battery. Helpfully, the vehicle refrigeration system 19 may avoid deep cycling a battery, which may dramatically shorten the life of a battery.

As will be appreciated by those skilled in the art, the department of transportation (DOT) allows for a free 400 pounds gross weight for an air conditioner. In an exemplary embodiment of the vehicle refrigeration system 19, the total weight is less than 350 pounds. Most typical approach units are around 500 pounds. Indeed, in typical approaches, 4 batteries alone (e.g. 12 volt AGM variety) weigh 300 pounds.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A vehicle refrigeration system comprising:
a vehicle power device comprising
a vehicle power source outputting a first voltage and comprising a vehicle starter battery, and an alternator coupled thereto,
a plurality of batteries, each battery providing a second voltage,
a plurality of switches coupled between each of said batteries, and
a controller coupled to said plurality of switches and configured to
place said plurality of switches in a first mode of operation so that said plurality of batteries is coupled in parallel and receives a charge from said vehicle power source, and
place said plurality of switches in a second mode of operation so that said plurality of batteries is coupled in series and provides a combined voltage greater than the first voltage and the second voltage; and
a vehicle refrigeration device comprising
an evaporator providing cooling based upon refrigerant fluid,
a condenser processing the refrigerant fluid downstream from said evaporator, and
a compressor operating based upon the combined voltage, and transmitting the refrigerant fluid from said evaporator to said condenser.

2. The vehicle refrigeration system of claim 1 wherein said condenser comprises:
first and second condenser units being spaced apart; and
first and second condenser fans being aligned with each other and both being between said first and second condenser units.

3. The vehicle refrigeration system of claim 1 wherein said compressor comprises an electrical motor operating based upon the combined voltage, and a compressor unit configured to be driven by said electrical motor.

4. The vehicle refrigeration system of claim 1 wherein said controller has a first input coupled to an output of said vehicle power source; and wherein said controller is configured to place said plurality of switches in the first mode of operation only when the first voltage is greater than or equal to a threshold voltage.

5. The vehicle refrigeration system of claim 4 wherein said controller has a second input coupled to an output of said plurality of batteries; and wherein said controller is configured to place said plurality of switches in the first mode of operation only when the second voltage is less than the threshold voltage.

6. The vehicle refrigeration system of claim 1 wherein said controller has a third input coupled to said compressor; and wherein said controller is configured to place said plurality of switches in the first and second modes of operation based upon an operational characteristic of said compressor.

7. The vehicle refrigeration system of claim 1 wherein said vehicle power device further comprises a power switch coupled between the vehicle power source and each battery of said plurality thereof.

8. The vehicle refrigeration system of claim 7 wherein said controller is configured to control said power switch.

9. The vehicle refrigeration system of claim 7 wherein said controller is configured to close said power switch after said plurality of switches has entered the first mode of operation.

10. The vehicle refrigeration system of claim 7 wherein said controller is configured to open said power switch in the second mode of operation.

11. A method for making a vehicle refrigeration system, the method comprising:
coupling a vehicle power device comprising
a vehicle power source outputting a first voltage and comprising a vehicle starter battery, and an alternator coupled thereto,
a plurality of batteries, each battery providing a second voltage,
a plurality of switches coupled between each of the batteries, and
a controller coupled to the plurality of switches and configured to
place the plurality of switches in a first mode of operation so that the plurality of batteries is coupled in parallel and receives a charge from the vehicle power source, and
place the plurality of switches in a second mode of operation so that the plurality of batteries is coupled in series and provides a combined voltage greater than the first voltage and the second voltage; and
coupling a vehicle refrigeration device to the vehicle power device, the vehicle refrigeration device comprising
an evaporator providing cooling based upon refrigerant fluid,
a condenser processing the refrigerant fluid downstream from the evaporator, and
a compressor
operating based upon the combined voltage, and transmitting the refrigerant fluid from the evaporator to the condenser.

12. The method of claim 11 wherein the condenser comprises:
first and second condenser units being spaced apart; and
first and second condenser fans being aligned with each other and both being between the first and second condenser units.

13. The method of claim 11 wherein the compressor comprises an electrical motor operating based upon the combined voltage, and a compressor unit to be driven by the electrical motor.

14. The method of claim 11 wherein the controller has a first input coupled to an output of the vehicle power source; and wherein the controller is configured to place the plurality of switches in the first mode of operation only when the first voltage is greater than or equal to a threshold voltage.

15. The method of claim 14 wherein the controller has a second input coupled to an output of the plurality of batteries; and wherein the controller is configured to place the plurality of switches in the first mode of operation only when the second voltage is less than the threshold voltage.

16. A method for operating a vehicle refrigeration system, the method comprising:
operating a vehicle power device by at least
operating a vehicle power source to output a first voltage, the vehicle power source comprising a vehicle starter battery, and an alternator coupled thereto, operating a plurality of batteries so that each battery provides a second voltage, operating a plurality of switches coupled between each of the batteries, and operating a controller coupled to the plurality of switches and to place the plurality of switches in a first mode of operation so that the plurality of batteries is coupled in parallel and receives a charge from the vehicle power source, and place the plurality of switches in a second mode of operation so that the plurality of batteries is coupled in series and provides a combined voltage greater than the first voltage and the second voltage; and operating a vehicle refrigeration device while coupled to the vehicle power device, the vehicle refrigeration device comprising an evaporator providing cooling based upon refrigerant fluid, a condenser processing the refrigerant fluid downstream from the evaporator, and a compressor operating based upon the combined voltage, and transmitting the refrigerant fluid from the evaporator to the condenser.

17. The method of claim 16 wherein the condenser comprises:

first and second condenser units being spaced apart; and first and second condenser fans being aligned with each other and both being between the first and second condenser units.

18. The method of claim 16 wherein the compressor comprises an electrical motor operating based upon the combined voltage, and a compressor unit configured to be driven by the electrical motor.

19. The method of claim 16 wherein the controller has a first input coupled to an output of the vehicle power source; and wherein the controller is configured to place the plurality of switches in the first mode of operation only when the first voltage is greater than or equal to a threshold voltage.

* * * * *